United States Patent [19]
Kurimoto et al.

[11] 3,789,501
[45] Feb. 5, 1974

[54] MACHINE TOOL WITH TOOL CHANGE DEVICE

[75] Inventors: Mikishi Kurimoto, Nagoya; Keniti Munekata, Kariya; Yoji Kamiya, Anjyo, all of Japan

[73] Assignee: Toyoda Koki Kabushiki Kaisha, Kariya-shi, Aichi-ken, Japan

[22] Filed: Nov. 30, 1971

[21] Appl. No.: 203,406

[30] Foreign Application Priority Data
Dec. 4, 1970 Japan............................ 45/107854

[52] U.S. Cl. .............................................. 29/568
[51] Int. Cl............................................... B23q 3/157
[58] Field of Search............................. 29/568, 264

[56] References Cited
UNITED STATES PATENTS

| | | | |
|---|---|---|---|
| 3,691,655 | 9/1972 | Kurimoto et al...................... | 29/568 |
| 3,541,677 | 11/1970 | Fiegler................................... | 29/568 |
| 3,516,149 | 6/1970 | Mickas.................................... | 29/568 |
| 3,613,224 | 10/1971 | Newton et al. ......................... | 29/568 |

Primary Examiner—Andrew R. Juhasz
Assistant Examiner—Z. R. Bilinsky
Attorney, Agent, or Firm—Norman F. Oblon et al.

[57] ABSTRACT

A machine tool is provided with an automatic tool change device for permitting the same to perform a variety of machining operations on a workpiece. The tool change device comprises a tool storage magazine installed on the floor adjacent the machine for removably storing a plurality of diverse tools, a carriage mounted on an upstanding column of the machine and an intermediate transfer device mounted on the carriage and carrying a tool holding device thereon. The carriage follows the movement of a spindle head receiving a spindle therein so that a tool change operation can be effected between the tool holding device and the spindle by a main transfer device immediately following a machining operation. Means are also provided for rendering the following movement of the carriage inoperative so that the intermediate transfer device may be rotated, while being retractable and extendable, in the direction of the tool storage magazine to permit a tool change operation by a sub-transfer device to be performed between the tool holding device and the tool storage magazine during the machining operation.

9 Claims, 19 Drawing Figures

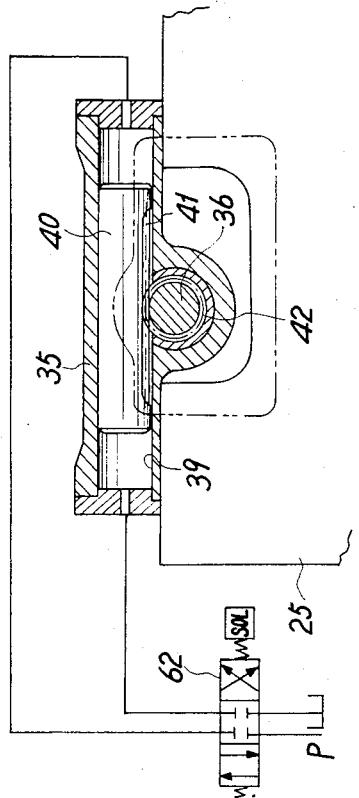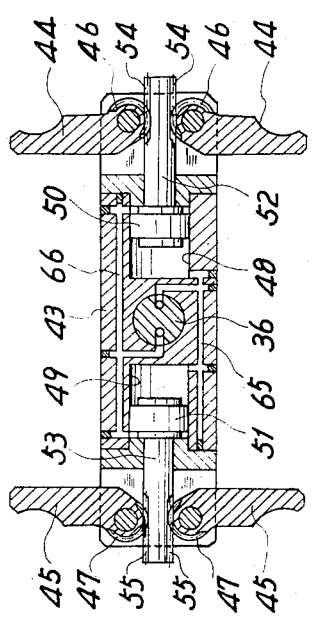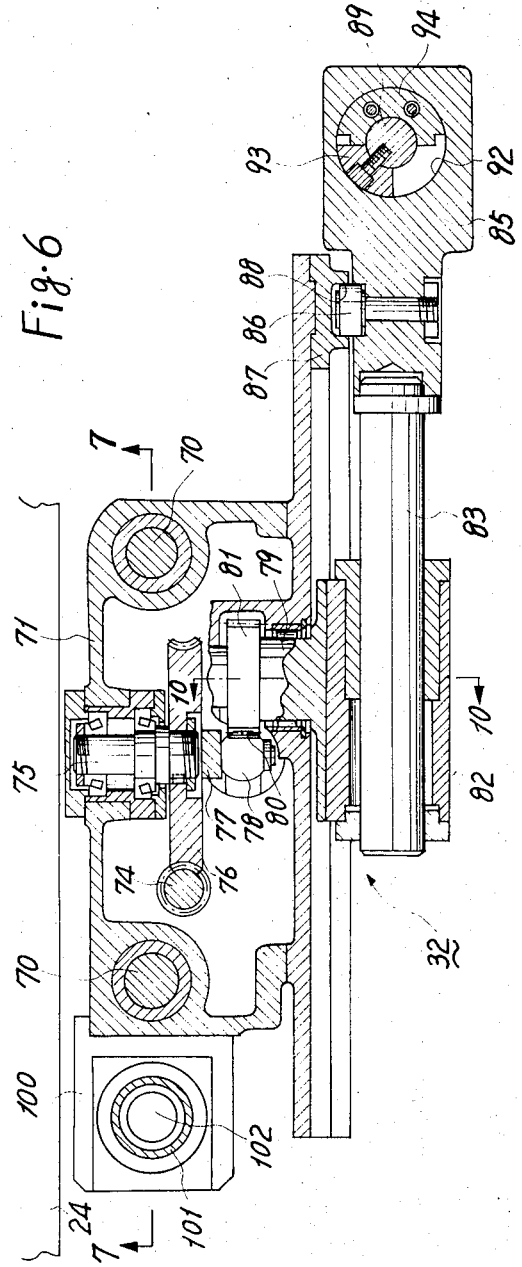

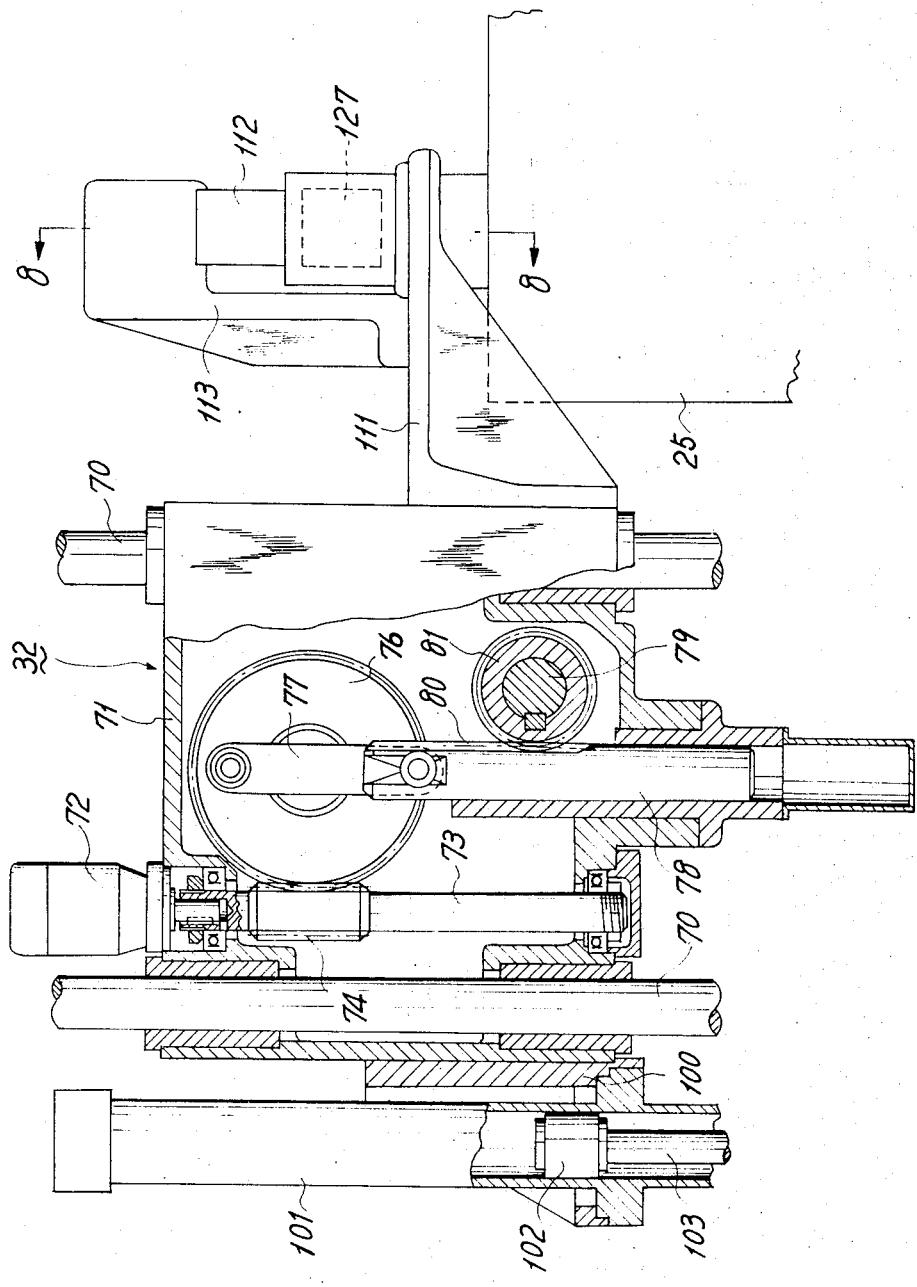

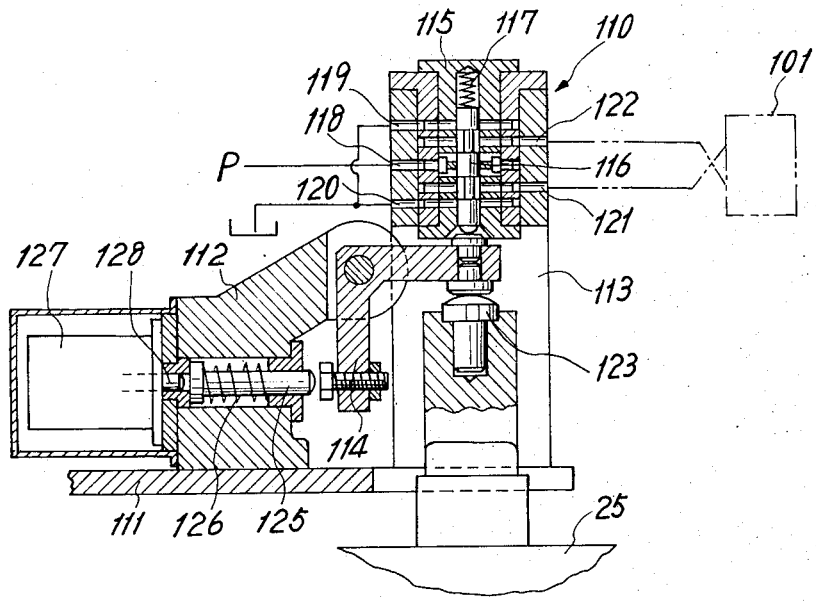
Fig. 8
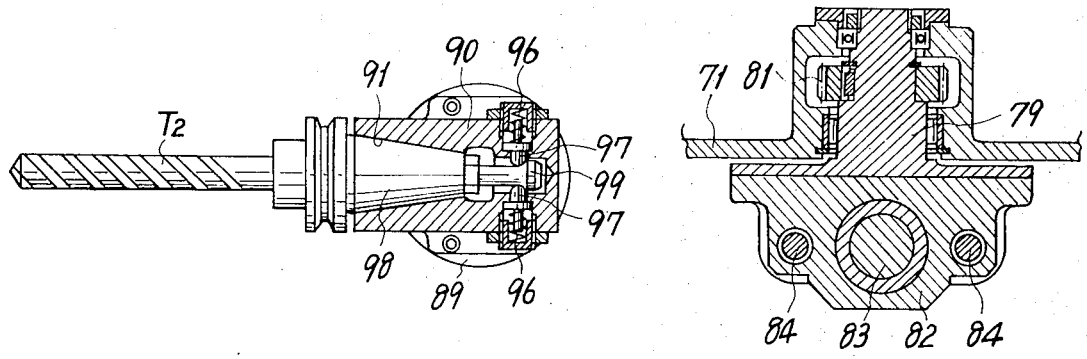
Fig. 9
Fig. 10

Patented Feb. 5, 1974

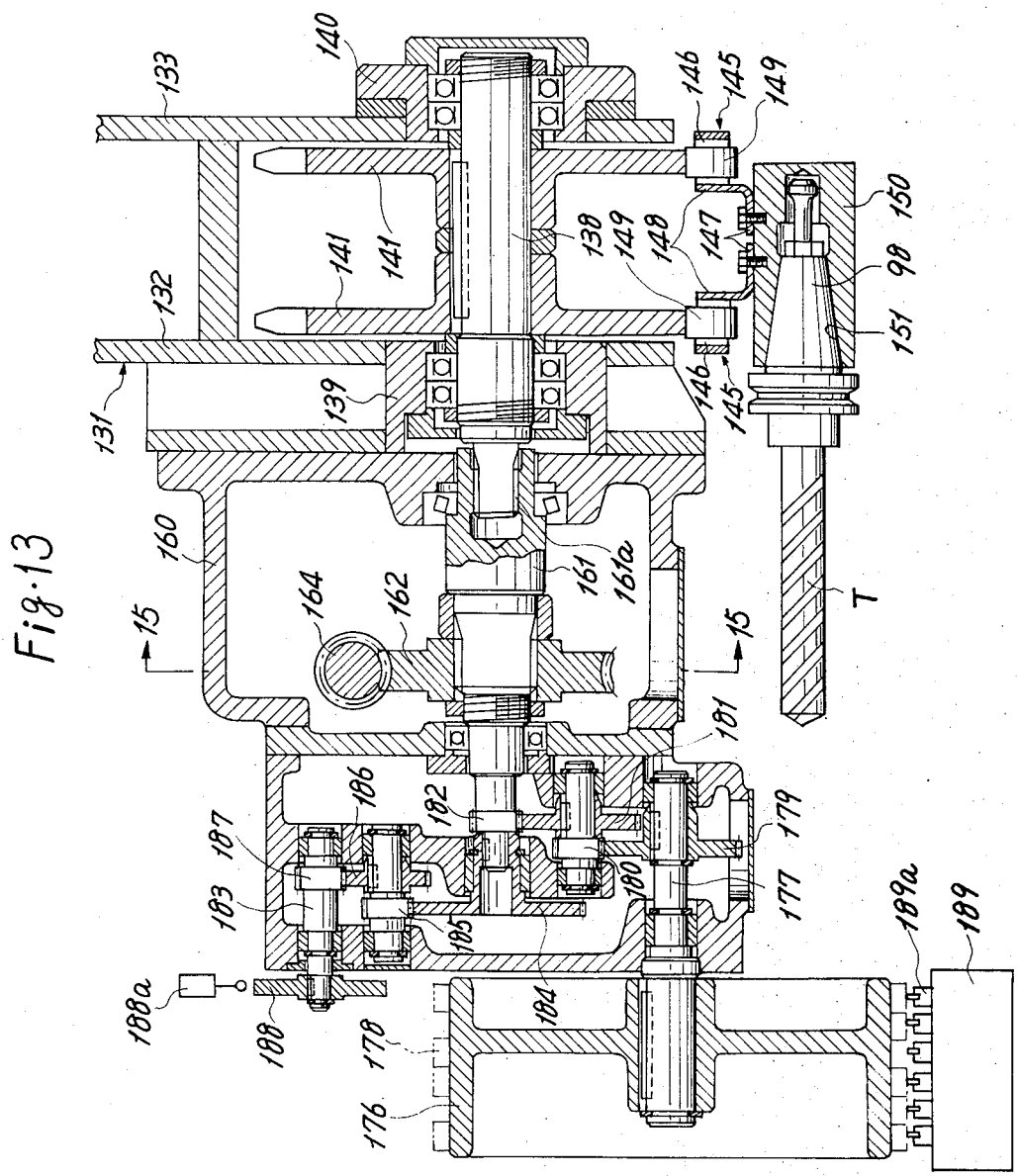

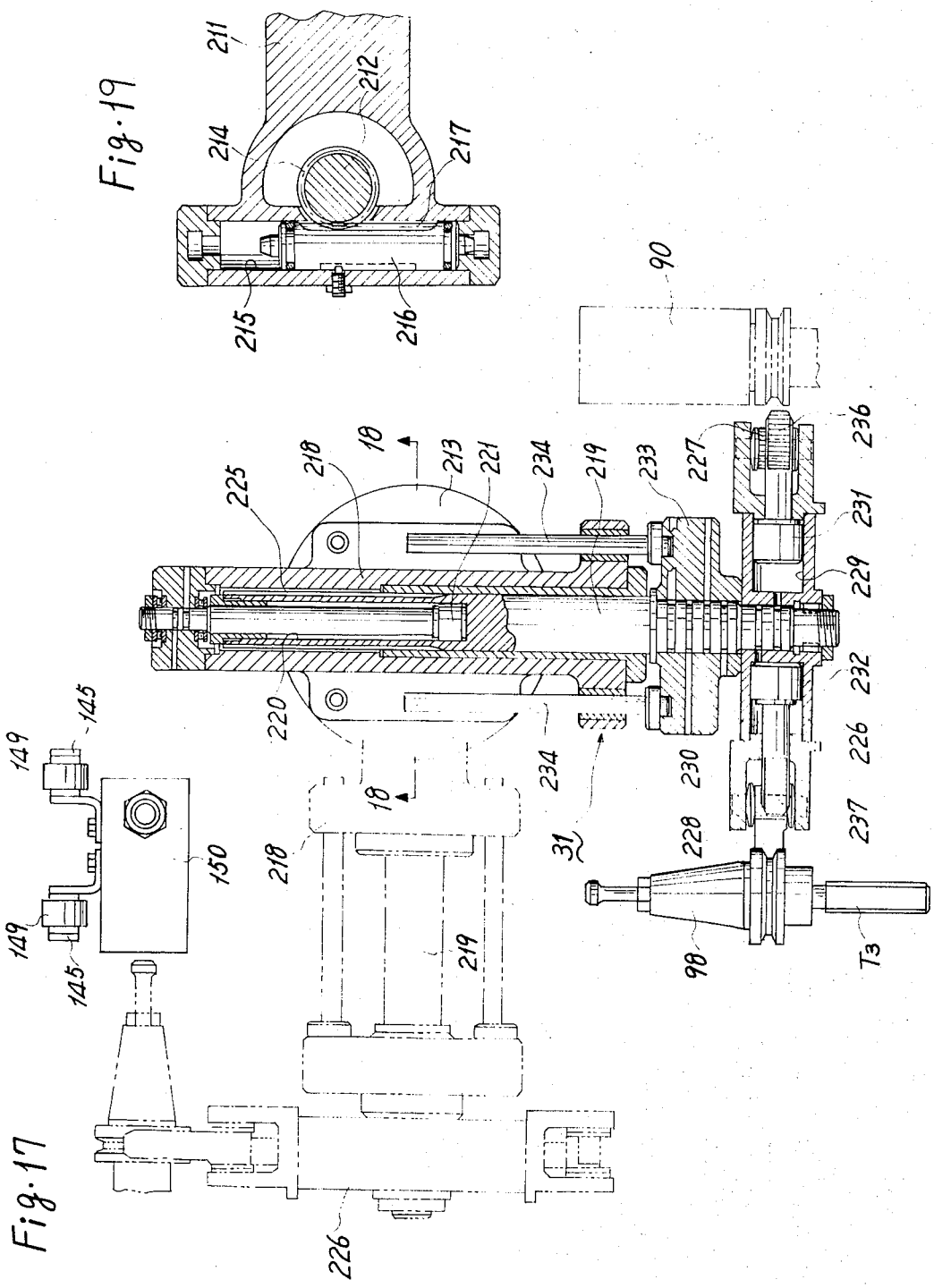

MACHINE TOOL WITH TOOL CHANGE DEVICE

BACKGROUND OF THE INVENTION

This invention relates generally to a machining apparatus provided with an automatic tool change device for interchanging a tool held in a spindle of the apparatus and a tool stored in a tool storage magazine for permitting the same to perform a variety of machining operations on a workpiece.

In a numerically controlled machine tool having an automatic tool change device, a tool storage magazine is generally installed on a fixed portion of the machine, or the floor, in spaced relation with a bed carrying an upstanding spindle head-supporting column, since such tool storage magazines become larger in size and heavier in weight in accordance with any increase in the number of diverse tools which they are designed to removably store. Installing the tool storage magazine on the floor is effective to prevent any vibration produced during a tool indexing operation on the magazine from being transmitted to the spindle, and thereby serves to increase the machining accuracy.

Under these circumstances, it is considered optimum to install the tool storage magazine adjacent to the side of the column in opposite relation with the spindle, as shown in FIG. 1, for the purpose of more effective operation, easier maintenance and smaller space requirements for the whole machine. However, the long distance between the spindle and the tool change position on the magazine has heretofore posed certain problems such that in the conventional machining apparatus having automatic tool change devices, the tool change cycle is complicated, and thereby takes a long time to complete the tool changing operation.

SUMMARY OF THE INVENTION

It is, therefore, an object of the present invention to provide a machine tool with an improved automatic tool change device for performing a tool change operation in a short time.

Another object of the present invention is to provide a workpiece machining apparatus with an automatic tool change device comprising a carriage for synchronous movement with the spindle of the workpiece machining apparatus and an intermediate transfer means moveably mounted on the carriage.

Another object of the present invention is to provide a workpiece machining apparatus with an automatic tool change device comprising an intermediate transfer device which is rotatable as well as being extendable for quickly and safely performing a tool changing operation.

Still another object of the present invention is to provide a workpiece machining apparatus with an automatic tool change device comprising a sub-transfer device which is rotatably through 90° in a horizontal plane for performing a tool change operation between the tools stored in a tool storage magazine and the spindle in perpendicular relation with each other.

BRIEF DESCRIPTION OF THE DRAWINGS

Various other objects, features and attendant advantages of the present invention will be more fully appreciated as the same becomes better understood from the following detailed description of the preferred embodiments of the present invention when considered in connection with the accompanying drawings, in which like reference numerals designate like or corresponding parts through the several views thereof, and wherein:

FIG. 4 is a sectional view taken along the line 4—4 of FIG. 3, and shows the manner in which gripping devices on the main transfer arm are pivoted into position for gripping tools to be exchanged;

FIG. 5 is a sectional view taken along the line 5—5 of FIG. 3, illustrating a control for rotating the main transfer arm for moving the tools being exchanged respectively between the spindle and a tool socket of the intermediate transfer device;

FIG. 6 is a sectional view taken along the line 6—6 of FIG. 2, illustrating the intermediate transfer device in greater detail;

FIG. 7 is a sectional view taken along the line 7—7 of FIG. 6, showing a carriage for supporting the intermediate transfer device which follows the spindle head;

FIG. 8 is a sectional view taken along the line 8—8 of FIG. 7, showing a control for the following operation of the carriage;

FIG. 9 is a sectional view taken along the line 9—9 of FIG. 2, and shows a device for resiliently holding a tool in the intermediate transfer device;

FIG. 10 is a sectional view taken along the line 10—10 of FIG. 6;

FIG. 13 is a sectional view taken along the line 13—13 of FIG. 12, illustrating means for indexing a desired tool socket in the magazine to a tool change position;

FIG. 17 is a sectional view taken along the line 17—17 of FIG. 16;

FIG. 19 is a sectional view taken along the line 19—19 of FIG. 18.

DESCRIPTION OF A PREFERRED EMBODIMENT

Figure 1:
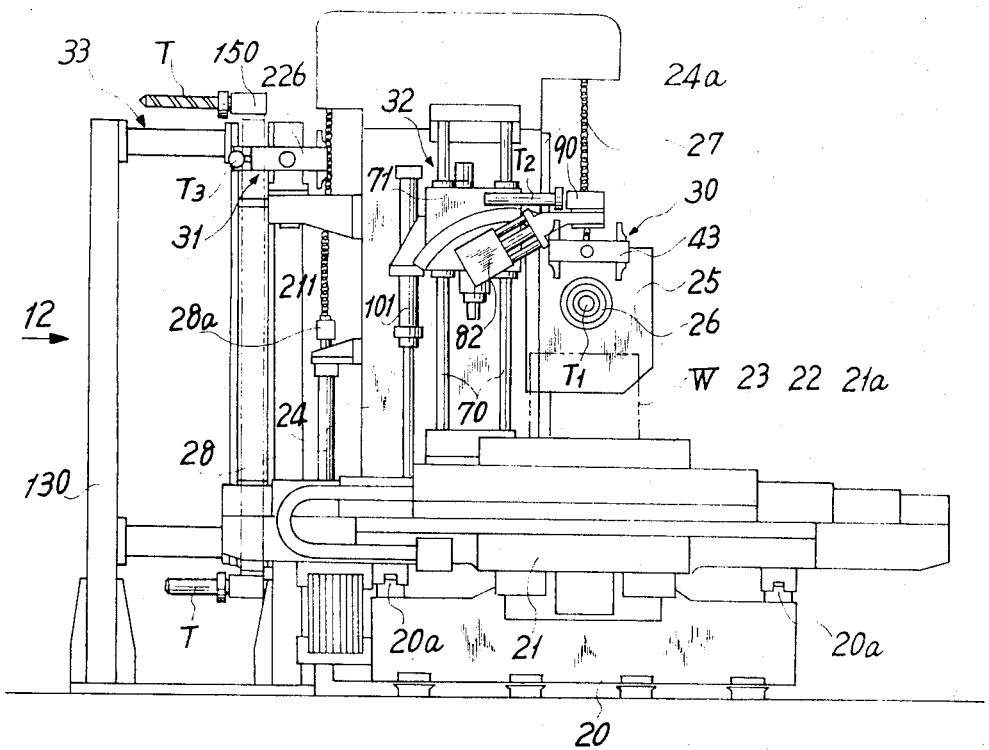
FIG. 1 is a front view of a machine constructed according to the present invention.

Referring now to the drawings and more particularly to FIG. 1, there is shown a bed 20 having a pair of parallel horizontal ways 20a for slidably supporting a saddle 21 for movement in a horizontal direction along the ways 20a. The saddle 21 is provided with ways 21a extending transversely of ways 20a on the bed 20 for slidably supporting a cross table 22 for movement along the ways 21a in a direction perpendicular to the path of movement of the saddle 21. Rotatably mounted on the cross table 22 is a rotary index table 23 which is adapted to support a workpiece W to be worked on.

On the rear end of the bed 20 there is mounted an upstanding column 24 having vertical ways 24a thereon for slidably supporting a spindle head 25 for movement in a vertical direction along the ways 24a. In the spindle head 25 there is rotatably mounted a spindle 26 into which a variety of tools T removably stored in a tool storage magazine 33 are adapted to be successively inserted for performing a machining operation on the workpiece W.

One end of a chain 27 is connected to the top surface of the spindle head 25, while the other end of the chain 27 is connected to one end of a piston rod 28a of a hydraulic balancing actuator 28 secured to the left sides of the bed 20 and the rear column 24 through sprocket wheels, not shown. The hydraulic balancing actuator 28 is designed to balance the weight of the spindle head 25 to permit smooth, vertical sliding movement thereof. The saddle 21, the cross table 22 and the spindle head 25 are driven by motors, not shown, for their respective movements.

With the arrangement described above, the spindle 26 and the workpiece W clamped on the rotary index table 23 may be mutually moved in three directions perpendicular to each other. Therefore, different machining operations may be successively applied on different working surfaces of the workpiece W by cooperation of relative movement between the spindle 26 and the workpiece W, angular indexing of the rotary index table 23 and an automatic tool change operation, to be described hereinafter.

On the top front side of the spindle head 25 there is provided a main transfer device 30 for replacing a previously used tool T in the spindle 26 with a new tool stored in a tool socket 90 on a carriage 71 of an intermediate transfer device 32 disposed on the front side of the column 24 for a succeeding machining operation. After the tool change operation between the tools respectively positioned in the spindle 26 and the tool socket 90 on the carriage 71 is performed, the carriage 71 is moved upwardly, independent of the workpiece operation of the tool that has been substituted in the spindle 26, to locate the tool socket 90 in a predetermined position. The tool socket 90 is then moved toward a sub-transfer device 31 which is disposed on the left side of the column 24 opposite the spindle head 25 in order to replace the used tool therein with a further yet unused tool in the particular working operation which is selected from among a plurality of tools removably stored in the tool storage magazine 33 by the sub-transfer device 31. The tool storage magazine 33 is installed on the floor adjacent to the column 24 in spaced relation with the bed 20.

Figure 3:
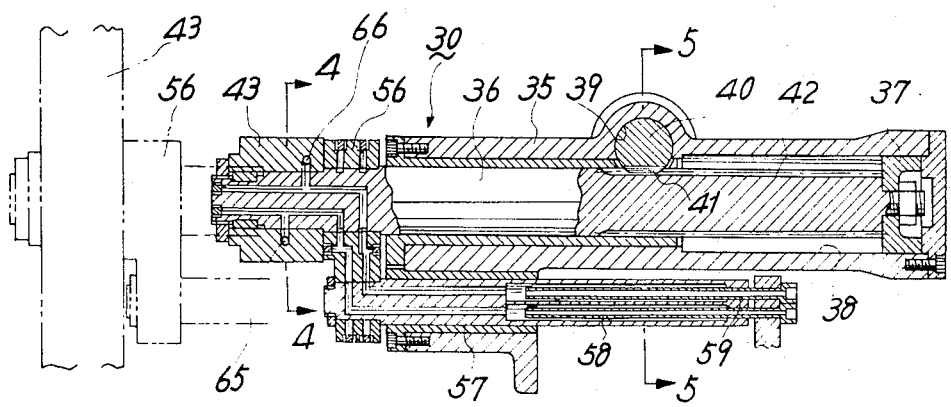
FIG. 3 is a sectional view taken along the line 3—3 of FIG. 2, showing the means for extending and retracting a main transfer arm of the main transfer device for replacing the tool in the spindle with one from an intermediate transfer device.
Figure 2:
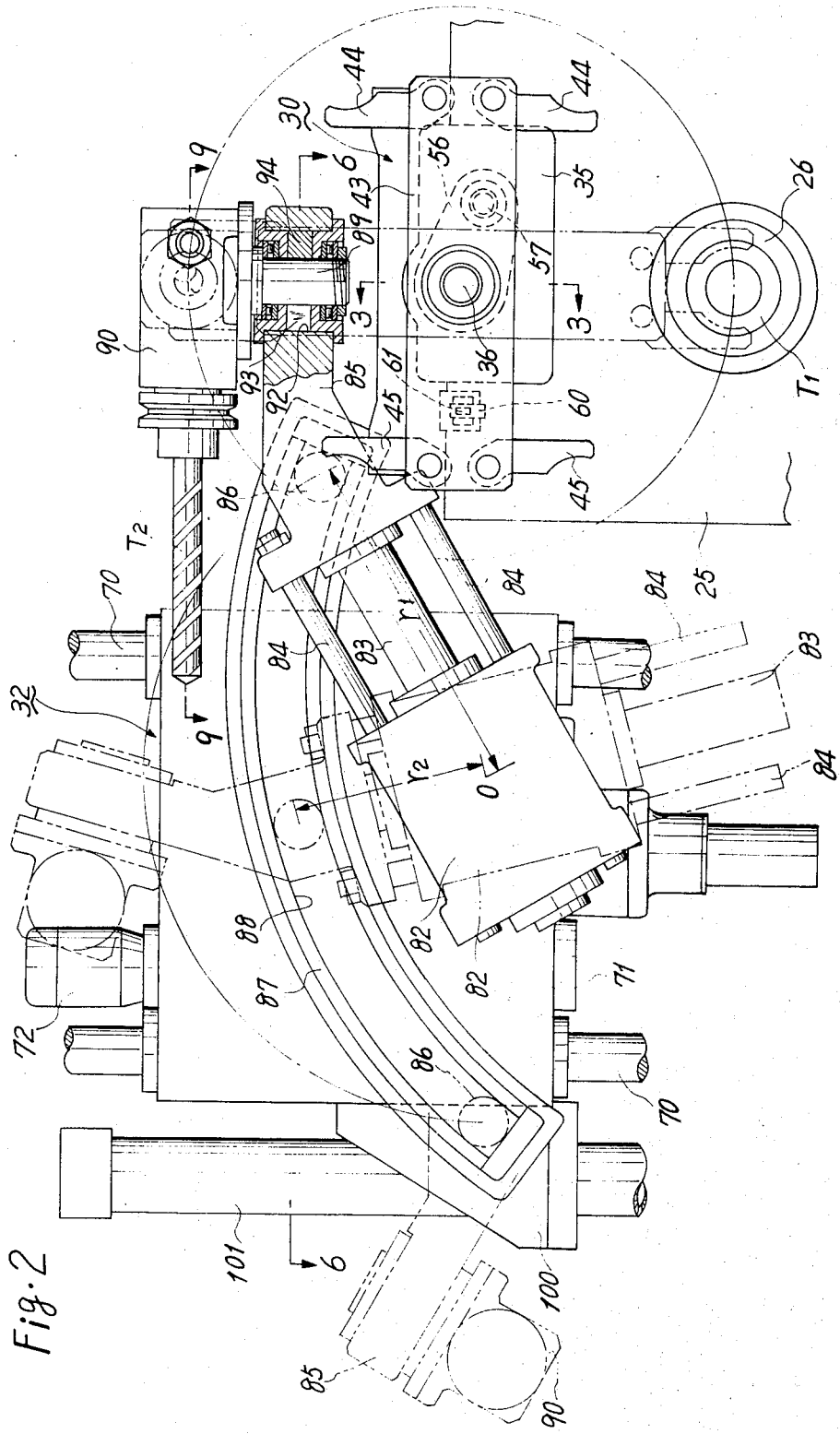
FIG. 2 is a detail fragmentary front view of a main transfer device and an intermediate transfer device shown in FIG. 1.

Referring now to FIGS. 2 through 4, the main transfer device 30 will be described in detail. The main transfer device 30 comprises a bracket 38 mounted on the upper front surface of the spindle head 25. An operating shaft 36 is slidably and rotatably received in the bracket 35 in parallel relation with the axis of the spindle 26, the front end of the shaft 36 extending outwardly of the front end of the bracket 35. A piston 37 is secured to the rear end of the operating shaft 36 and is slidably received in a cylinder 38 formed in the bracket 35. The operating shaft 36 has formed thereon a gear 42 of relatively long axial length engaging a rack 41 formed on a piston 40 which extends transversely of the axis of the operating shaft 36 and is slidably received in a cylinder 39 also formed in the bracket 35. A main transfer arm 43 is secured to the front end of the operating shaft 36 and has pairs of pivotal grips 44 and 45 on longitudinally opposite ends thereof. The pairs of grips 44 and 45 have sector gears 46 and 47, respectively, at the peripheries of the pivoted ends thereof. In the main transfer arm 43 there are provided opposing cylinders 48 and 49 in which pistons 50 and 51 are respectively longitudinally slidably received. Piston rods 52 and 53 of the pistons 50 and 51 are respectively provided with side racks 54 and 55 disposed on radially opposite sides thereof and engaging the sector gears 46 and 47, respectively, to close or open the grips 44 and 45 upon actuation of the cylinders 48 and 49 to cause movement of the pistons 50 and 51 therein.

A distributing plate 56 adjacent to the main transfer arm 43 is rotatably mounted on the operating shaft 36. A guide shaft 57 is slidably received in a through bore of the bracket 35 in parallel relation with the operating shaft 36. One end of the guide shaft 57 extends outwardly of the one end of the bracket 35 and is secured to the distributing plate 56, while the other end thereof extends outwardly of the other end of the bracket 35 and receives therein, in telescopic relationship therewith, two stationary pipe lines 58 and 59, each being connected at one end thereof to a fluid supply source through a change-over valve, not shown. The stationary pipe lines 58 and 59 are respectively connected at the other ends thereof to passages 65 and 66 opening into head ends and rod ends of the cylinders 48 and 49, respectively, through passages formed in the guide shaft 57 and the distributing plate 56. With the arrangement described above, the cylinders 48 and 49 may be actuated in any axial and rotational position of the operating shaft 36.

The piston 40 is normally held in a neutral position, as shown in FIG. 5, so that the main transfer arm 43 is held in the horizontal position shown in solid line in FIG. 2. In this horizontal position of the main transfer arm 43, the pistons 50 and 51 of the cylinders 48 and 49 are moved outwardly by means of fluid pressure supplied in the passage 65, so that each pair of grips 44 and 45 are opened, or in a tool releasing condition. When the machining operation is completed by the tool T1 in the spindle 26, the piston 40 is moved to the right, as viewed in FIG. 5, by means of pressure fluid, so that the main transfer arm 43 is turned clockwise through 90°, or from the horizontal position to a vertical position, to perform a tool change operation between the tool T1 in the spindle 26 and a tool T2 in the tool socket 90 on the intermediate transfer device 32. Then the grips 44 and 45 are closed to grasp the tools in the spindle 26 and the tool socket 90, as shown in dotted lines in FIG. 2. The operating shaft 36 is then advanced longitudinally by actuation of the cylinder 38 to the position shown in dotted line in FIG. 3, to extract the tools from the spindle 26 and the tool socket 90. In the advanced position of the operating shaft 36, the gear 42 of the operating shaft 36 is also maintained in engagement with the rack 41 of the piston 40 because of the relatively axially long teeth thereof. When the piston 40 is moved to the left to the full extent permitted, the main transfer arm 43 is turned counterclockwise by 180° to replace or interchange the tools.

Then, the cylinder 38 is actuated to insert the interchanged tools into the spindle 26 and the tool socket 90, and thereafter the grips 44 and 45 are opened. The cylinder 39 is thereafter actuated to move the piston 40 to the right to turn the main transfer arm 43 clockwise by 90° to locate it in the original horizontal position thereof.

In order to confirm the proper horizontal disposition of the main transfer arm 43, a dog 60 secured to the main transfer arm 43, as shown in FIG. 2, actuates a limit switch 61 secured to the front of the spindle head 25. The actuation of the limit switch 61 causes a change-over valve 62, shown in FIG. 5, to block the cylinder 39 to maintain the horizontal location of the main transfer arm 43 during the machining operation. When the main transfer arm 43 is turned counterclockwise by 180°, the limit switch 61 is not actuated by the dog 60 because of the advanced position of the main transfer arm 43.

The operation of the main transfer arm 43 described hereinbefore performs the tool change operation between the tool held in the spindle 26 and the tool held in the tool socket 90 on the carriage 71 which is capable of following the movement of the spindle head 25 in a predetermined positional relationship therewith, as described hereinafter.

Referring now to FIGS. 2 and 6 through 10, the intermediate transfer device 32 comprises the carriage 71 which is guided by two parallel guide shafts 70 vertically disposed in front of the column 24. On the left side of the carriage 71 there is secured a bracket 100 which is provided with a hydraulic cylinder 101. A piston 102 is slidably received in the cylinder 101 having integrally formed thereon a piston rod 103 which extends downwardly from the cylinder 101 and is fixedly secured to the lower portion of the column 24. The hydraulic cylinder 101 is connected to the fluid supply source through a servo valve device 110, shown in FIG. 8, which is operative to cause the carriage 71 to follow the spindle head 25 along the guide shafts 70 in a vertical direction. To this end, the carriage 71 has secured thereto a supporting bracket 111 on which are mounted a bracket 112 for a solenoid 127 operative for rendering the follow motion of the carriage 71 inoperative and a housing 113 for the servo valve device 110. A control link 114 in the form of a bell crank arm is pivotally supported on the upper end portion of the bracket 112. In the housing 113 there is secured a valve sleeve 115 having therein a vertical blind bore in which a servo spool 116 is slidably received. The lower end of the servo spool 116 bears against the upper surface of one leg of the control link 114 under the biasing force of a compression spring 117 disposed between the upper end of the servo spool 116 and the blind bore of the valve sleeve 115. The servo spool 116 has three axially spaced land portions separated by two reduced portions. The intermediate land portion opposes a supply port 118, the upper and lower land portions oppose exhaust ports 119 and 120, and the upper and lower reduced portions oppose control ports 122 and 121, respectively, which are connected with the lower and upper chambers of the cylinder 101. An abutment 123 secured on a bracket mounted on the spindle head 25 opposes the lower surface of the one leg of the control link 112.

With this arrangement, during the following motion of the carriage 71, the abutment 123 bears against the lower surface of the one leg of the control link 114 and the lower end of the servo spool 116 bears against the upper surface of the leg of the control link 114 under the force of the compression spring 117, so that the servo spool 116 is moved vertically in response to movement of the spindle head 25. In the neutral position of the servo spool 116, as illustrated in FIG. 8, the supply and exhaust ports 118, 119 and 120 are blocked by the land portions of the servo spool 116. When the servo spool 116 is moved downwardly in response to the downward movement of the spindle head 25, fluid communication is established between the supply port 118 and the control port 122 and between the lower exhaust port 120 and the control port 121, so that the hydraulic cylinder 101 is actuated causing the same to slide downwardly over the piston 102 therein to shift the carriage 71 downwardly therewith, whereby it follows the downward movement of the spindle head 25, and thus maintains the servo spool 116 in a neutral position.

On the other hand, when the servo spool 116 is moved upwardly from the neutral position in response to an upward movement of the spindle head 25, fluid communication is established between the supply port 118 and the control port 121 and between the upper exhaust port 119 and the control port 122, so that the hydraulic cylinder 101 is actuated causing upward movement of the cylinder 101 to shift the carriage 71 upwardly therewith, such that it follows the upward movement of the spindle head 25 and thereby continuously maintains the servo spool 116 in its neutral position. Consequently, the carriage 71 automatically follows the vertical movement of the spindle head 25 being maintained in predetermined positional relation therewith.

In the bracket 112 there is slidably received a push shaft 125 which opposes the other leg of the control link 114. The push shaft 125 is forced by a compression spring 126 into a position where the push shaft 125 is disengaged from the other leg of the control link 114. The solenoid 127 adjacent to the push shaft 125 is also secured to the bracket 112. A movable iron core 128 of the solenoid 127 is adapted by energization of the solenoid 127 to be advanced outwardly therefrom to move the push shaft 125 into engagement with the other leg of the control link 114 against the biasing force of the spring 126. The movement of the push shaft 125 against the spring 126 causes counterclockwise rotation of the control link 114 to shift the servo spool 116 upwardly and to disengage the one leg of the control link 114 from the abutment 123, whereby the carriage 71 may be moved upwardly into engagement with a positive stop, not shown, independent of movement of the spindle head 25 for locating the tool socket 90 in a predetermined position suitable for performing a tool change operation between the tools in the tool socket 90 and the subtransfer device 31.

On the top of the carriage 71 there is secured a motor 72, the output shaft of which is drivingly connected to a vertical worm shaft 73 rotatably supported in the carriage 71. The worm shaft 73 has integrally formed therewith a worm 74 engaging a worm wheel 76 secured to a horizontally disposed shaft 75 rotatably received in the carriage 71. One end of a link member 77 is pivoted to the side wall of the worm wheel 76 in predetermined spaced relation with the axis thereof, while the other end of the link member 77 is pivoted to the upper portion of a vertical shaft 78 slidably received in the carriage 71. The worm wheel 76 is rotatable, by means of motor 72, clockwise by 180° from its position shown in FIG. 7 to move the shaft 78 downwardly. The moving speed of the shaft 78 is changed along a sine curve by a crank mechanism. More particularly, the moving speed is initially relatively slow and then is gradually increased, thereafter gradually decreased and finally becomes slow. This change in the moving speed of the shaft 78 is effective to reduce shocks which may be caused by the turning of a holding arm 85 carrying the tool socket 90, described hereinafter.

A rotary shaft 79 is rotatably mounted in the carriage 71 in parallel relation with the spindle 26 and is provided with a gear 81 engaging a rack 80 formed on the shaft 78. The rotary shaft 79 is thus rotatable by movement of the shaft 78 through a predetermined angle at a speed changed along a sine curve. One end of the shaft 79 projects beyond the carriage 71 and carries a supporting bracket 82. Slidably received in the bracket 82 are a supporting shaft 83 and a pair of guide shafts 84 which carry the holding arm 85 at one of the ends thereof. Rotatably mounted in the holding arm 85 is a roller 86 which is held in slidable engagement with an arcuate cam groove 88 formed on a guide member 87 secured to the front of the carriage 71. The cam groove 88 is formed in such a manner that the distances between the axis of the shaft 79 and the opposite ends thereof are $r1$ and the distance between the axis of the shaft 79 and the central portion thereof is $r2$ which is smaller than the distance $r1$ so that the holding arm 85 is shortened and extended relative to the bracket 82 by means of the supporting shaft 83 and guide shafts 84 when the shaft 79 is rotated. This arrangement is effective to reduce the moment of inertia caused by the turning of the holding arm 85 and the tool socket 90 of relatively heavy weight to decrease shocks which may be caused at the turning ends thereof.

The tool socket 90 has a tapered bore 91 for receiving a tool T and is fixedly secured on a vertically disposed rotary table or shaft 89 which is rotatably journalled on one end of the holding arm 85. In the holding arm 85 there also is provided a hydraulic rotary cylinder 92 which accommodates a rotatable member 93 secured to the rotary shaft 89. The rotary member 93 is movable into engagement with either side of a stationary member 94 secured to the holding arm 85 by actuation of the rotary cylinder 92 so that the tool socket 90 may be horizontally turned 90° in either direction.

The tool socket 90 is further provided with a pair of opposed plungers 97 resiliently urged inwardly toward each other by springs 96 for resiliently holding a draw-in bolt 99 provided on a shank 98 of the tool T in the tool socket 90.

When the tool socket 90 is turned to an operative position in parallel relation with the spindle 26 with the holding arm 85 being held in the position shown in FIG. 2, the axis of the tapered bore 91 is positioned in a plane containing the axes of the operating shaft 36 of the main transfer arm 43 and the spindle 26 so as to permit the tool change operation between the tools in the spindle 26 and the tool socket 90 to be carried out, as described hereinbefore.

During a machining operation, the tool socket 90 is maintained in an inoperative position where the axis thereof is at right angles with the axis of the spindle 26 so that the tool T held in the tool socket 90 does not interfere with the workpiece W in any operative position of the spindle relative to the workpiece W, which is especially important when a large size workpiece is being worked on.

After a particular machining operation by the tool held in the spindle 26 has been completed, the tool socket 90 is turned by 90° into the operative position and the tool change operation between the tools in the spindle 26 and the tool socket 90, as previously described, is immediately performed without moving the spindle head 25 vertically. Upon completion of the tool change operation between the tools in the spindle 26 and the tool socket 90, the carriage 71 is moved upwardly by energization of the solenoid 127 into engagement with the positive stop independent of movement of the spindle head 25 to locate the tool socket 90 in the predetermined position, as described hereinbefore. Upon engagement of the carriage 71 with the positive stop, the holding arm 85 carrying the tool socket 90 is moved by actuation of the motor 72 toward the sub-transfer device 31 along the cam groove 88 for replacing the used tool in the tool socket 90 with a new one to be used for a succeeding working operation. Upon completion of the tool change operation between the tools in the tool socket 90 and the sub-transfer device 31, as described hereinafter, the holding arm 85 is returned along cam groove 88 toward the spindle 26 and the tool socket holding the new tool is then turned by 90° into its inoperative position whereupon the solenoid 127 is deenergized to permit the carriage 71 to follow the movement of the spindle head 25.

Figure 11:
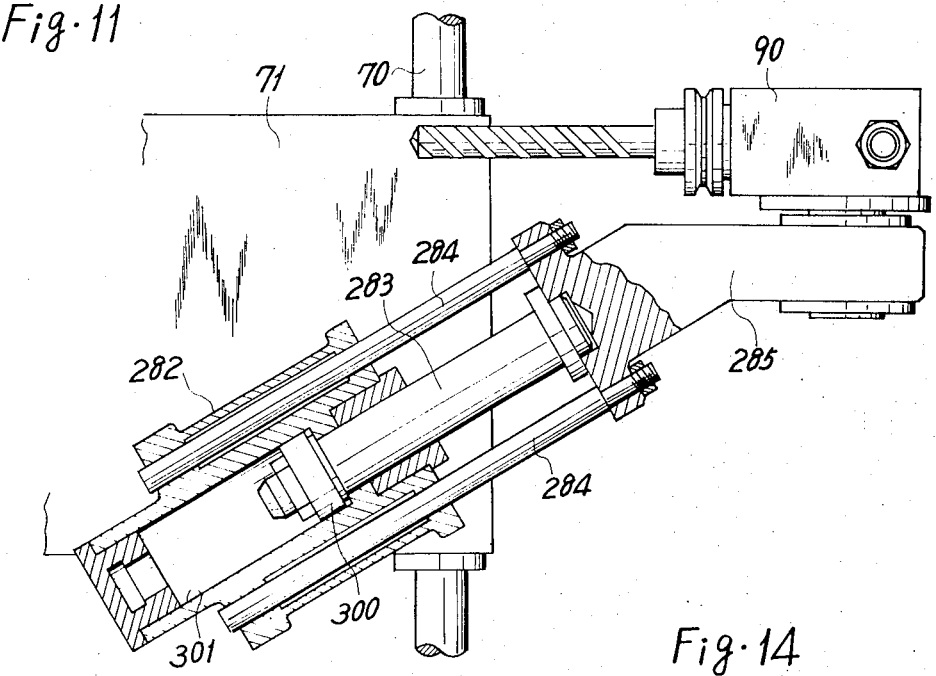
FIG. 11 is a detail fragmentary front view, partly in section, of another embodiment of an intermediate transfer device.

FIG. 11 shows another embodiment for shortening and extending the holding arm. A rotatable supporting bracket 282 is provided with a hydraulic cylinder 301 in which a piston 300 is slidably received. The piston 300 is connected to a supporting shaft 283. A pair of guide shafts 284 are slidably received in the supporting bracket 282 in parallel relation with the supporting shaft 283 and the supporting shaft 283 and the guide shafts 284 carrying a holding arm 285 for supporting the tool socket 90.

With this arrangement, piston 300 is normally held in the position shown in FIG. 11 to extend the holding arm 285. When the supporting bracket 282 is rotated, however, the piston 300 is moved downwardly to shorten the holding arm 285 to reduce moment of inertia caused by the turning of the holding arm 285 and the tool socket 90, thereby to decrease shocks which may be caused at the turning ends thereof.

Figure 14:
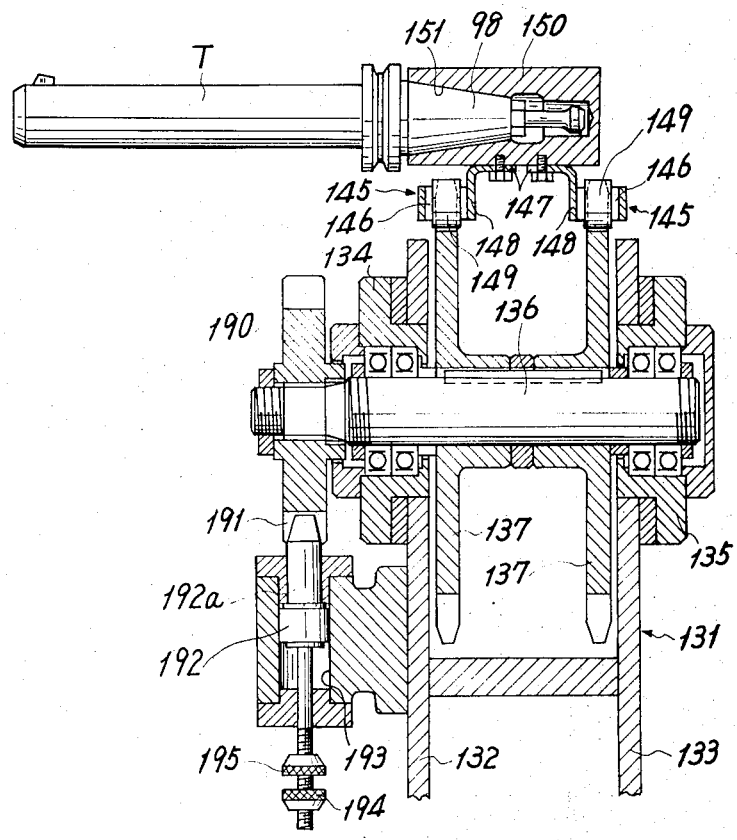
FIG. 14 is a sectional view taken along the line 14—14 of FIG. 12.
Figure 12:
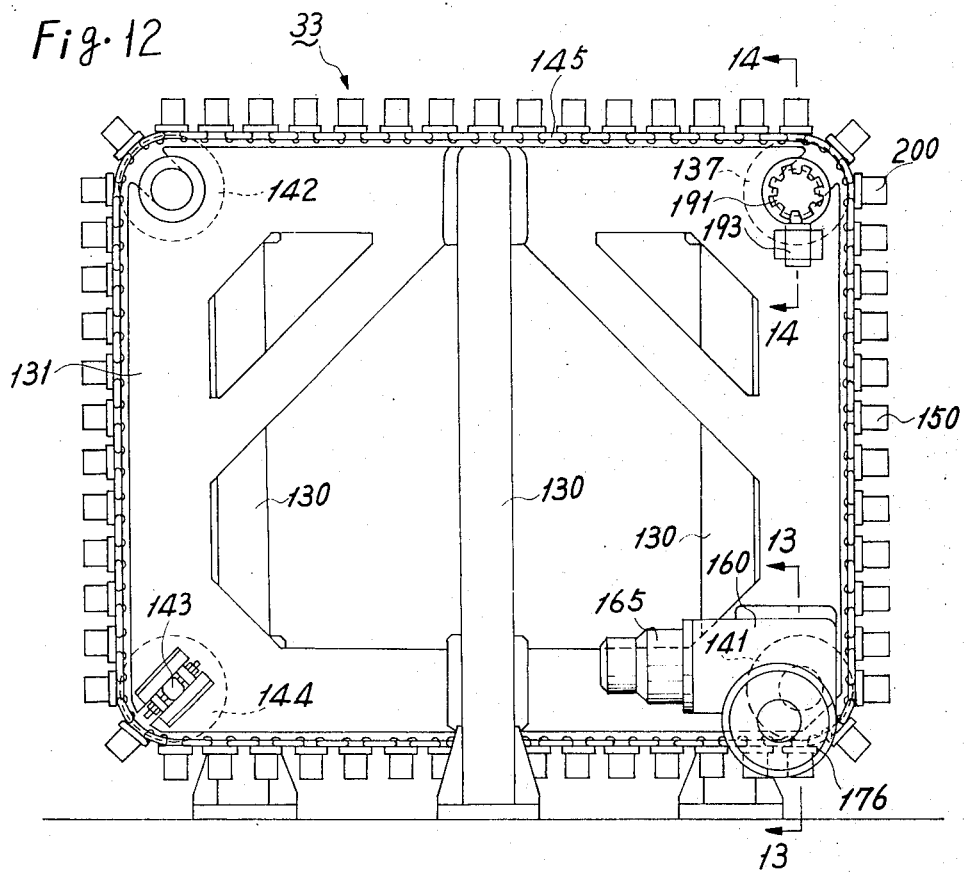
FIG. 12 is a detail side view of a tool storage magazine taken along the arrow 12 of FIG. 1.
Figure 15:
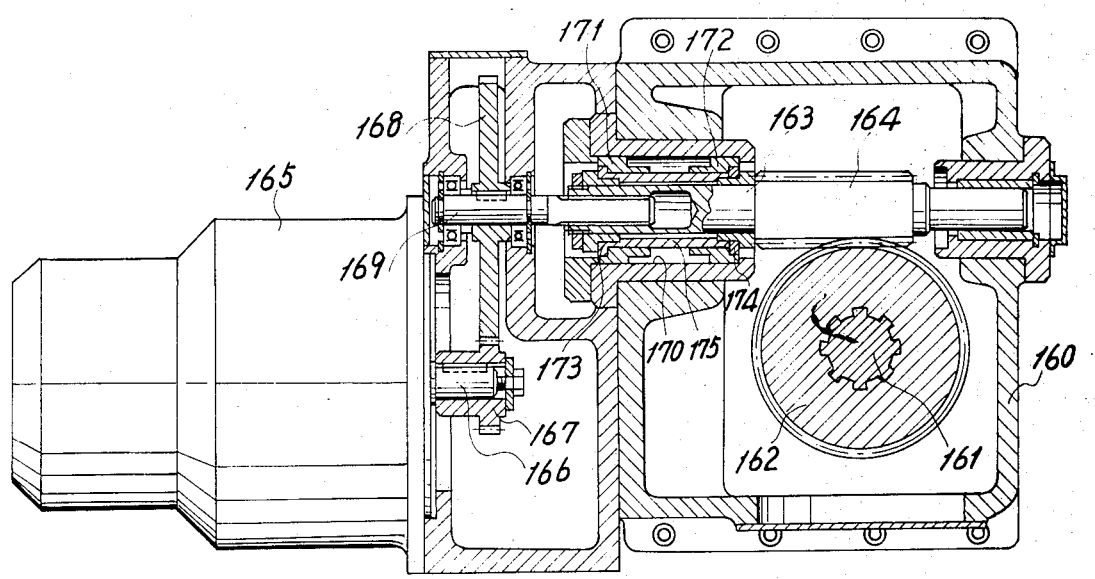
FIG. 15 is a sectional view taken along the line 15—15 of FIG. 13.
Figure 16:
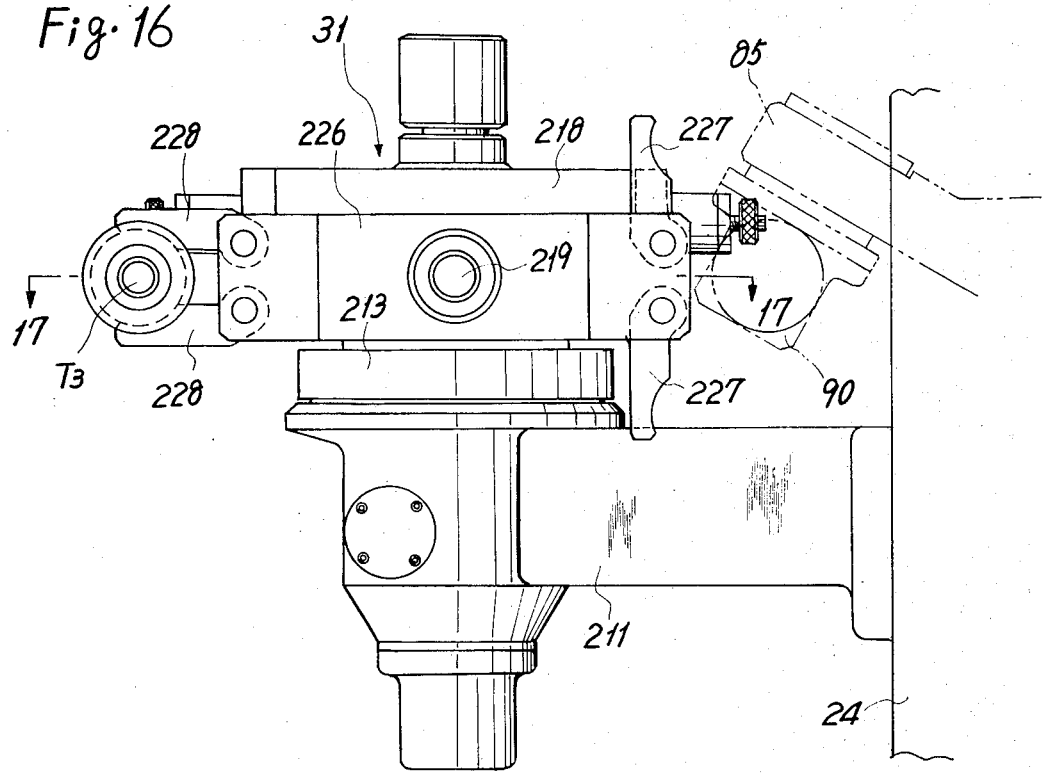
FIG. 16 is a detail fragmentary front view of a sub-transfer device shown in FIG. 1.
Figure 18:
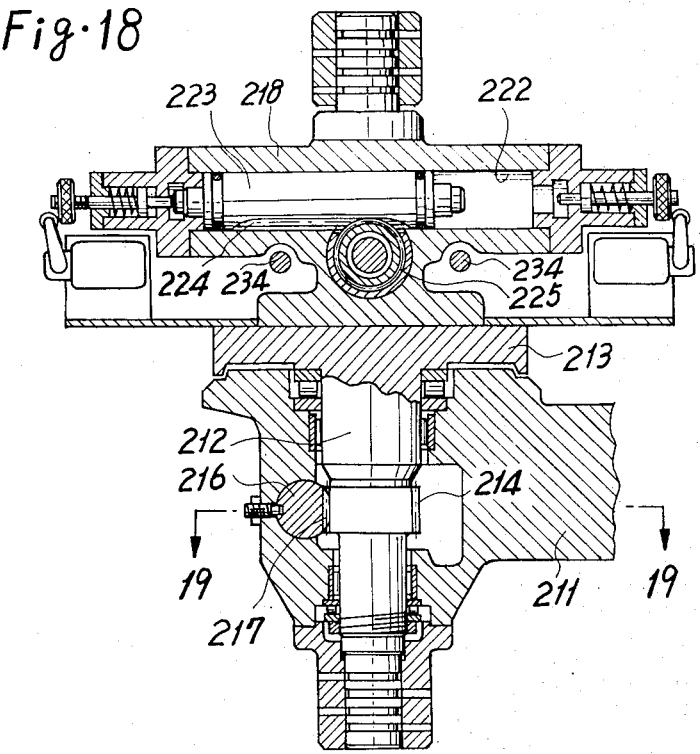
FIG. 18 is a sectional view taken along the line 18—18 of FIG. 17.

Referring now to FIGS. 12 through 15, the tool storage magazine 33 comprises a magazine base 131 having two vertically disposed parallel base plates 132 and 133 which is supported adjacent to the column 24 by upstanding brackets 130 installed on the floor in spaced relation with the bed 20. On the upper right end of the base plates 132 and 133, as viewed in FIG. 12, there are secured supporting members 134 and 135, respectively, which rotatably support a rotary shaft 136 having keyed thereto a pair of opposed sprocket wheels 137 between the base plates 132 and 133, as shown in FIG. 14. On the lower right end of the base plates 132 and 133, as viewed in FIG. 12, there are secured supporting members 139 and 140, respectively, which rotatably support a drive shaft 138 having keyed thereto a pair of opposed sprocket wheels 141 between the base plates 132 and 133, as shown in FIG. 13. A pair of opposed pulleys 142 are rotatably supported on the upper left end of the base plates 132 and 133. On the lower left end of the base plates 132 and 133, there is adjustably supported a shaft 143 which rotatably supports a pair of opposed tension pulleys 144. A pair of flexible endless chains 145 for supporting a variety of tools are suspended by the sprocket wheels 137 and 141 and pulleys 142 and 144. Each of the chains 145 comprises outer and inner link plates 146 and 148 connected by chain rollers 149. The sprocket wheels 137 and 141 are adapted to engage the chain rollers 149 of the chains 145. Each of the inner link plates 148 is provided with an inwardly extending member 147 for supporting a plurality of equally spaced tool sockets 150 to store a variety of tools T. Each tool socket 150 has a tapered bore 151 therein for receiving the tool T and a tool holding device, not shown, which may be of the same construction as that of the tool socket 90 for resiliently supporting the tool to prevent the same from falling off. The axis of each tool stored in the tool socket 150 is at right angles with respect to the axis of the spindle 26.

The drive shaft 138 carrying the opposed sprocket wheels 141 is connected to a shaft 161 through a splined engagement indicated at 161a for relative axial movement. The shaft 161 is rotatably mounted in a gear housing 160 secured to the magazine base 131 and has secured thereto a worm wheel 162 engaging a worm 164 formed on a shaft 163. The shaft 163 is held in splined engagement at one end thereof with a shaft 169 rotatably mounted in the gear housing 160 for relative axial movement. The shaft 169 has keyed thereto a gear 168 engaging a smaller gear 167 which is keyed to an output shaft 166 of a drive motor 165. The shaft 163 is also rotatably connected at one end thereof to a sleeve 175 having shoulder portions 173 and 174 respectively engaging a pair of pistons 171 and 172 slidably received in a thrust damping cylinder 170. Pressure fluid is admitted between the pistons 171 and 172 to hold the shaft 163 in position under a normal drive of the sprocket wheels 141. The shaft 163 is permitted to move axially only when a thrust force above the fluid pressure is applied thereon.

Outside the gear housing 160, a coding drum 176 for selecting the desired tool from a plurality of tools stored in the tool sockets 150 of the tool storage magazine 33 is mounted on a shaft 177 rotatably received in the gear housing 160. The coding drum 176 has on its peripheral surface a series of dogs 178 based on a binary coded decimal and adapted to actuate a series of limit switches 189a arranged on a reading device 189 to index the desired tool socket 150 to a tool change position 200, shown in FIG. 12, where the tool change operation between the tool held in the tool socket 150 of the magazine 33 and the tool held in the sub-transfer device 31 is performed, as described hereinafter. The shaft 177 is drivingly connected to the shaft 161 through gears 179, 180, 181 and 182 in such a manner that when the chains 145 are rotated through one revolution, the coding drum 176 is also rotated through one revolution so that a particular tool socket 150 on the chains 145 may be distinguished from the other ones by means of the series of dogs 178.

The shaft 161 is also drivingly connected to a shaft 183 through gears 184, 185, 186 and 187. The shaft 183 carries at one end thereof a dog plate 188 which is adapted to actuate a limit switch 188a every time the chains 145 are rotated by one pitch or the distance between the centers of two adjacent tool sockets 150. To this end, the gear ratio between gears 184, 185, 186 and 187 is determined in such a manner that the dog plate 188 is rotated one revolution when the chains 145 are rotated by one pitch.

The rotary shaft 136 carrying the opposed sprocket wheels 137 holds at one end thereof an index plate 190 provided with a predetermined number of recesses 191 on the peripheral edge thereof. A hydraulic cylinder 193 in which a piston 192 is slidably received is secured to the magazine base. The piston 192 has formed thereon a locating pin 192a which is adapted to be engaged with one of recesses 191 of the index plate 190 upon actuation of the cylinder 193. The locating pin 192a is normally held out of engagement with the recesses 191 to permit the sprocket wheels 137 to rotate, which is confirmed by actuation of a limit switch, not shown, caused by a dog 194 carried by the piston 192.

When the desired tool socket 150 approaches the tool change position 200 through actuation of the motor 165, the particular coding dogs on the coding drum 176 actuate the associated limit switches on the reading device 189 to produce a signal in coincidence with a designated tool coding signal preset by a tape command of an electric control system, not shown. The coincidence signal, together with the actuation of the limit switch 188a by means of the dog plate 188, causes the locating pin 192a to be moved by actuation of the cylinder 193 toward the periphery of the index plate 190 and the motor 165 to be reduced in speed. Thus, when the desired tool socket designated by the tape command is positioned in the tool change position 200, the locating pin 192a is moved into engagement with one of the recesses 191 of the index plate 190 to index the sprocket wheels 137. A limit switch, not shown, is actuated by a dog 195 carried by the piston 192 to confirm the engagement of the locating pin 192a with the recess 191 and serves to brake the motor 165 to thereby stop the same. The worm 164 is effectively moved axially by means of the damping cylinder 170 during the time between engagement of the locating pin 192a within the recess 191 and the stopping of the motor 165. As described above, the desired tool socket may be indexed to the tool change position 200 by means of the tape command.

Referring to FIGS. 16 through 19, the sub-transfer device 31 comprises a supporting bracket 211 secured to the left side of the column 24. On the supporting bracket 211 there is rotatably mounted a base member 213 having formed therewith a vertically disposed shaft 212. As shown in FIG. 19, the supporting bracket 211 has a cylinder 215 therein in which a piston 216 is slidably received. The piston has a rack 217 engaging a gear 214 formed on the shaft 212. Upon actuation of the cylinder 215 the piston 216 thereby rotates the base member 213 through 90° in a horizontal plane. On the base member 213 there is secured a housing 218 in which an operating shaft 219 is slidably and rotatably received. In the rear end portion of the operating shaft 219, there is provided a cylinder 220 in which a piston 221 is slidably received. The piston 221 has formed therewith a piston rod 221a which is permitted to rotate, but is restrained from axial movement relative to the housing 218. In the housing 218, there is provided a cylinder 222 in which a piston 223 is slidably received for movement perpendicular to that of the piston 221 of the cylinder 220. The piston 223 has a rack 224 engaging a gear 225 of relatively long axial length which is formed on the periphery of the operating shaft 219.

On the front end portion of the operating shaft 219 there is secured a sub-transfer arm 226 having formed therein cylinders 229 and 230 in which pistons 231 and 232 are respectively slidably received, as in the case of the main transfer arm 43. The pistons 231 and 232 serve to open and close grips 227 and 228 pivotally mounted on opposed ends of the sub-transfer arm 226 by means of rack and pinion mechanisms 236 and 237, respectively. Each set of opposite chambers of the cylinders 231 and 232 are connected to a fluid supply source through fluid passages formed in a bracket 233 rotatably mounted on the operating shaft 219 in such a manner that the grips 227 and 228 are individually operated in any axial and angular position of the sub-transfer arm 226. A pair of guide shafts 234 are secured at one end to the bracket 233 and are slidably received in the housing 218 to guide the axial movement of the operating shaft 219. The grips 227 are used only for replacing the used tool held in the socket 90 on the carriage 71 in its original tool socket 150 in the tool change position 200 of the magazine 33. On the other hand, the grips 228 are used only for carrying the succeeding tool out from the magazine 33 to insert it into the tool socket 90 on the carriage 71.

The base member 213 is normally held by the cylinder 215 in the position shown in solid line in FIG. 17 to dispose the operating shaft 219 in parallel relation with the spindle 26. In this state, the grips 227, waiting for the used tool in the tool socket 90 on the carriage 71, are opened and the grips 228 hold the succeeding tool extracted from the tool change position 200 of the tool storage magazine 33. When the tool socket 90 holding the used tool is moved into a position shown in dotted line in FIG. 16 by the turning of the holding arm 85 after a particular machining operation, the grips 227 are closed by actuation of the cylinder 229 to grasp the used tool and then the operating shaft 219 is advanced axially to extract the used tool from the tool socket 90. Upon extraction of the used tool from the tool socket 90, the sub-transfer arm 226 is turned clockwise through 180° in a vertical plane and then retracted axially to insert the succeeding tool grasped by the grips 228 into the tool socket 90. The grips 228 are then opened. The tool socket 90 holding the succeeding tool is then moved toward the spindle head 25 by turning the holding arm 85.

At the same time, the sub-transfer arm 226 is advanced axially and thereafter turned clockwise through 90° in a horizontal plane to a position, shown in dotted line in FIG. 17, and the used tool is aligned with its associated tool socket 150 which has been indexed to the tool change position 200 of the magazine 33. The sub-transfer arm 226 is then retracted to insert the used tool into its associated tool socket 150. Upon insertion of the used tool into its associated tool socket, the grips 227 are opened. The sub-transfer arm 226 is then turned 180° in a vertical plane to align the grips 228 with the tool change position 200 of the magazine 33.

At the same time, the chains 145 of the tool storage magazine 33 are rotated to index a new tool for the next succeeding machining operation to the tool change position 200. Upon completion of indexing the new tool to the tool change position 200, the grips 228 are closed to grasp the new tool from its associated tool, then advanced to extract the same socket 150.

Then, the arm 226 is turned counterclockwise 90° in a horizontal plane and thereafter retracted axially to its original position shown in solid line in FIG. 17, whereby the tool change operations between the intermediate transfer device 32 and the sub-transfer device 31 and between the sub-transfer device 31 and the tool storage magazine 33 are completed.

While the invention has been described by means of specific embodiments, it should be understood that the novel characteristics thereof may be incorporated in other structural forms without departing from the spirit and scope of the invention as defined in the following claims.

What is claimed as new and desired to be secured by letters patent of the United States is:

1. An apparatus for machining a workpiece comprising:
   a bed;
   an upstanding column mounted on said bed;
   a spindle head mounted on said upstanding column for movement vertically thereon;
   a spindle rotatably mounted in said spindle head and adapted to receive diverse machining tools;
   a tool storage magazine for removably storing said diverse tools being mounted in spaced relation with said bed;
   means for selectively indexing said diverse tools to a tool change position on said magazine;
   a carriage mounted on said column for parallel movement with said spindle head;
   intermediate transfer means rotatably mounted on said carriage and being extensible with respect to the axis of rotation thereof;
   tool holding means mounted on said intermediate transfer means;
   means for moving said tool holding means between a first predetermined position with respect to the axis of said spindle and a second predetermined position;
   main transfer means mounted on said spindle head for transferring a tool between said spindle and said tool holding means in said first predetermined position;
   first control means for causing said carriage to follow the movement of said spindle head for maintaining said tool holding means in said first predetermined position so that the tool exchange by said main transfer means may be made between said spindle and said tool holding means;
   second control means for rendering the follow movement of said carriage with respect to said spindle head inoperative and for moving said tool holding means into said second predetermined position;
   means for rotating said intermediate transfer means to move said tool holding means between said second predetermined position and a third predetermined position with respect to said tool change position on said magazine;
   means for shortening said intermediate transfer means during the turning movement thereof and for extending the same at the turning ends thereof; and
   sub-transfer means for transferring a tool between said tool holding means in said third predetermined position and said tool change position on said magazine.

2. An apparatus as set forth in claim 1, wherein said intermediate transfer means comprises:
- a supporting member rotatably mounted on said carriage;
- a holding member slidably but non-rotatably received in said supporting member and carrying said tool holding means; and wherein
- said means for shortening and extending said intermediate transfer means comprises a roller rotatably mounted in said holding member, and a guide member mounted on said carriage, said roller being held in slidable engagement with said guide member, and said guide member being formed in such a manner that the distance between the axes of rotation of said supporting member and of said roller is substantially maximum at the opposite ends of said guide member.

3. An apparatus as set forth in claim 2, wherein said guide member has an arcuate shape.

4. An apparatus as set forth in claim 1, wherein said intermediate transfer means comprises:
- a supporting member rotatably mounted on said carriage;
- a holding member slidably but non-rotatably received in said supporting member and carrying said tool holding means; and wherein
- said means for shortening and extending said intermediate transfer means comprises a hydraulic cylinder, the piston rod thereof being connected to said holding member.

5. An apparatus as set forth in claim 1, wherein said means for rotating said intermediate transfer means comprises:
- a crank mechanism for changing the rotational speed of said intermediate transfer means along a sine curve.

6. An apparatus as set forth in claim 5, wherein said crank mechanism comprises:
- a motor mounted on said carriage;
- a worm drivingly connected to said motor;
- a worm wheel engaged with said worm;
- a link member pivotally connected at one end thereof to a side wall of said worm wheel in spaced relation with the axis thereof; and
- a shaft slidably received in said carriage, the other end of said link member being pivotally connected to said shaft, and said shaft being drivingly connected to said intermediate transfer means through a rack and pinion mechanism.

7. An apparatus as set forth in claim 1, wherein said tool storage magazine removably stores said diverse tools in perpendicular relation with said spindle, and wherein said sub-transfer means is rotatable in a horizontal plane through 90° for transferring a tool between said tool holding means in said third position and said tool change position on said magazine.

8. An apparatus for machining a workpiece comprising:
- a bed;
- a column mounted on said bed;
- a spindle head mounted on said column for movement thereon;
- a spindle rotatably mounted about an axis in said spindle head and adapted to receive a machining tool therein;
- a tool storage magazine for removably storing diverse tools being disposed in independent relation with said spindle head;
- means for selectively indexing a desired tool to a tool change position on said magazine;
- a carriage mounted on said column for movement in a path parallel with that of movement of the spindle head;
- first power means for moving said carriage;
- intermediate transfer means movably mounted on said carriage and adapted to hold a tool therein;
- main transfer means for transferring a tool between the spindle and the intermediate transfer means at a first position rear the spindle;
- first control means for controlling the operation of the first power means in a manner such that the carriage may follow the movement of the spindle head to maintain the intermediate transfer means at the first position so that the tool transfer operation may be preformed by the main transfer means between the spindle and the intermediate transfer means at the first position;
- second control means for rendering said first control means inoperative and for controlling the operation of the first power means in a manner such that the carriage may be moved to move the intermediate transfer means into a second position;
- second power means for rotating said intermediate transfer means about an axis parallel to the spindle axis between the second position and a third position near the tool change position on the magazine, wherein said tool storage means is installed near the column on the opposite side thereof from the spindle head and
- sub-transfer means for transferring a tool between the intermediate transfer means at the third position and the tool change position on the magazine.

9. An apparatus as set forth in claim 8, wherein said intermediate transfer means comprises:
- a holding member moveably mounted on said carriage;
- tool holding means for holding a tool therein being rotatably mounted on said holding member;
- a third power means for rotating said tool holding means between a position where the tool held therein is disposed in parallel relation with the spindle and a position where the tool held therein is disposed in perpendicular relation with the spindle.

* * * * *